G. W. SMITH.
TIRE TRACTION LUG.
APPLICATION FILED JAN. 31, 1921.
1,426,229.
Patented Aug. 15, 1922.
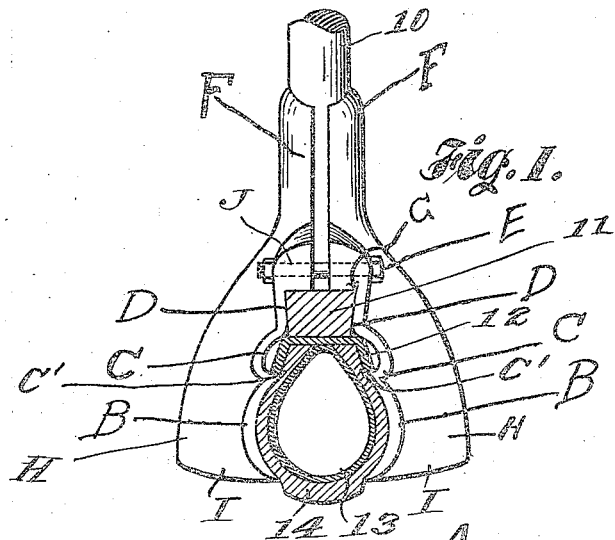
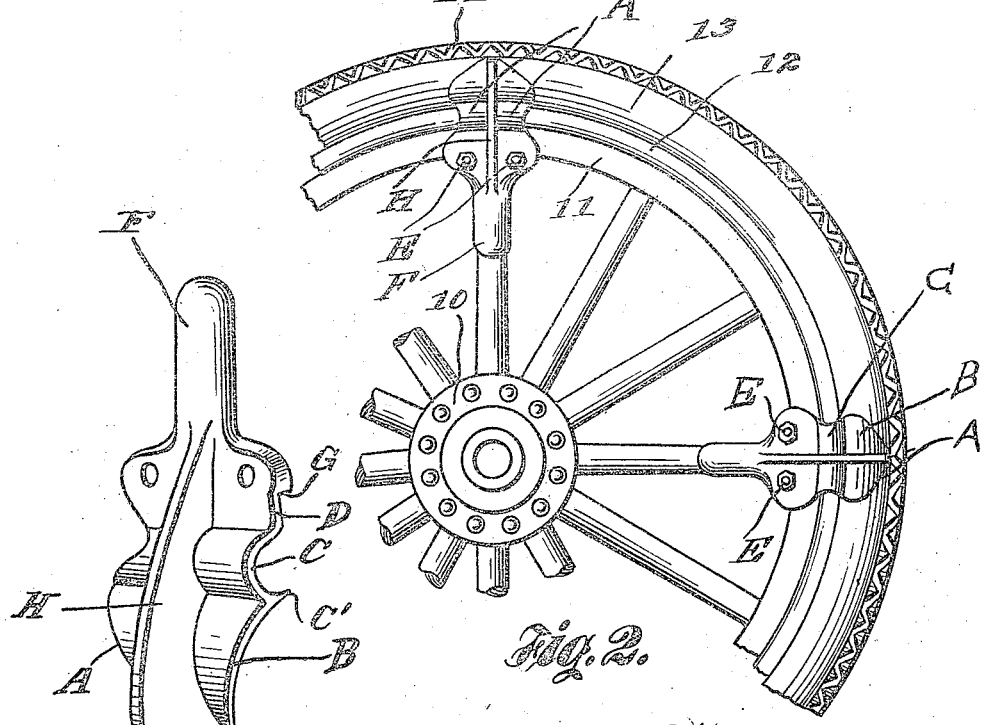
INVENTOR.
BY
ATTORNEYS.

UNITED STATES PATENT OFFICE.

GEORGE W. SMITH, OF DALLAS, TEXAS.

TIRE TRACTION LUG.

1,426,229. Specification of Letters Patent. Patented Aug. 15, 1922.

Application filed January 31, 1921. Serial No. 441,522.

*To all whom it may concern:*

Be it known that I, GEORGE W. SMITH, a citizen of the United States, residing at Dallas, in the county of Dallas and State of Texas, have invented certain new and useful Improvements in Tire Traction Lugs, of which the following is a specification.

This invention relates to a traction lug or attachment for vehicle wheels, particularly automobile wheels equipped with pneumatic tires.

It is generally aimed to improve and render a device of this class more efficient and to provide one which is particularly an improvement on the construction set forth in Letters Patent of the United States #1,315,688, issued to me on the 9th day of September, 1919, by avoiding means crossing the tread of the tire and thus the bumping incident to contact of such means with the ground.

Another object is to provide a lug or attachment in similar sections terminating short of the tread of the tire and having bracing engagement with both the wheel felly and the rim in order to more substantially secure the lug in place.

Another object is to provide a lug provided with an ear to directly engage the ground, which ear is elongated to reinforce the lug, and which lug has spoke engaging shanks, and bolts to secure the lugs in place disposable on opposite sides of a spoke.

Additional objects and advantages will become apparent from a consideration of the description following taken in connection with accompanying drawings illustrating one practical embodiment.

In said drawings:—

Figure 1 is a view showing a wheel and tire fragmentarily and in radial section, with the improved traction lug in place, Figure 2 is a fragmentary side elevation of a wheel showing a plurality of the traction lugs in place, and Figure 3 is a detail perspective view of one of the traction lug sections.

Like reference characters designate like or similar parts in the different views.

To facilitate an understanding of the invention, a wheel has been fragmentarily shown as at 10 which is to be taken as a conventional automobile or vehicle wheel. Of the wheel the felly is designated 11, on which a conventional rim 12 is mounted which in turn mounts a pneumatic tire at 13 provided with a usual offset non-skid band or tread 14. Each section comprises a plurality of sections A which as shown may be made similar and in a single rigid piece of metal. Each section may be of any suitable width and preferably has a tire-embracing portion B, desirably arcuate in conformity to the shape of the tire. A rim engaging portion is shown at C, preferably being dished or concaved as shown and having an inwardly extending hook C′ at its junction with the portion B so as to overlap the free edges of the flanges of the rim 12. At G, the sections A are notched to provide shoulders or walls substantially at an angle to each other so that one will engage a side of the felly 11 while the other will engage the inner annular wall thereof. It will be noted that the felly-engaging portion D may rest against the edge of the inner annular wall of the rim 12 as shown in Figure 1.

Integral with each section A is an ear H which extends longitudinally thereof and serves as a reinforcing flange. The outer ends of the ears or flanges H are relatively wide as at I, and terminate short of the tread 14, and are preferably deflected or tapered away from the tire towards the axis of the wheel.

The sections may be secured to the wheel in any suitable manner. They preferably having arcuate elongated shanks F to receive and conform to the shape of the engaged spoke of the wheel 10. Suitable openings are provided through each section at reinforced or thickened portions J which accommodate removable bolts E, placed one on each side of the adjacent spoke.

In practice, as the surfaces I are raised with respect to the tread 14, they will not ordinarily engage the road bed nor interfere with the usual resilient action of the tire 13. In the event mud, sand, snow, or the like is encountered which renders traction difficult, tread 14 will so extend into the same that the ears H will engage the same and provide the necessary traction.

Particular attention is called to the fact that radial thrust of the sections is effectively withstood in view of the engagement of the device with both the rim and the felly, as by means of the hook C′ and the shoulders at the notches G. It will also be understood that the device may be readily applied or removed through proper manipulation of the bolt E.

As merely one practical embodiment has been illustrated and described, it is to be understood that changes in the details may be resorted to provided they fall within the spirit and scope of the invention.

Having thus described the invention, what I claim is:—

1. A tire traction lug comprising a hook to engage the free edge of a tire mounting rim, a shoulder to overlap the inner wall of a felly, a traction lug extending downwardly from the hook and an upwardly extending concaved ear to engage a spoke of a wheel, said hook and shoulder serving to resist radial displacement of the lug.

2. A tire traction lug comprising a wedge shaped portion to engage the free edge of the tire mounting rim, means to engage the inner annular wall and a side wall of the felly, means to fasten the lug to a spoke of the wheel, and a curved portion extending downwardly from the portion first named and embracing the side wall of the tire and a laterally extending combined traction lug and reinforcing rib carried by said tire embracing plate.

3. A tire traction lug comprising a hook to engage the free edge of a tire mounting rim, a shoulder to overlap the inner wall of a felly, a traction lug extending downwardly from the hook and an upwardly extending ear to engage a spoke of a wheel, said hook and shoulder serving to resist radial displacement of the lug.

GEORGE W. SMITH.